United States Patent [19]

Vanderplow

[11] Patent Number: 4,864,765
[45] Date of Patent: Sep. 12, 1989

[54] REMOVABLE SPOON AND MOUNT

[76] Inventor: Allen P. Vanderplow, 5712 Glenwood Dr., Racine, Wis. 53406

[21] Appl. No.: 214,766

[22] Filed: Jul. 5, 1988

Related U.S. Application Data

[63] Continuation-in-part of Ser. No. 204,903, Jun. 10, 1988.

[51] Int. Cl.[4] ............................................. A01K 85/00
[52] U.S. Cl. ................................... 43/42.19; 43/42.16
[58] Field of Search ................ 43/42.09, 42.16, 42.19, 43/42.20, 42.21, 42.22, 43.12

[56] References Cited

U.S. PATENT DOCUMENTS 3,488,877  1/1970  Carabasse ........................... 43/42.19
4,090,319  5/1978  Wolfe ................................. 43/42.19

FOREIGN PATENT DOCUMENTS 687699  3/1951  United Kingdom ............... 43/42.19

*Primary Examiner*—M. Jordan
*Attorney, Agent, or Firm*—Peter N. Jansson

[57] ABSTRACT

Improved fishing lure apparatus of the type having a spoon with gap extending to its mounting hole for easy attachment. The clevis has differing first and second leg portions and the apparatus includes blocking means on the clevis to prevent inadvertent disconnection of the spoon from the clevis.

13 Claims, 1 Drawing Sheet

4,864,765

REMOVABLE SPOON AND MOUNT

RELATED APPLICATION

This is a continuation-in-part of patent application Ser. No. 204,903, filed June 10, 1988, entitled IMPROVED SPOON AND MOUNT.

FIELD OF THE INVENTION

This invention is related generally to fishing lure apparatus and, more particularly, to spoons and the mounting thereof with the fishing lure apparatus.

BACKGROUND OF THE INVENTION

In the field of fishing lure apparatus, spoons are used as important fish-attacting components of lure apparatus or as the major component. The term "spoon" is used because of the slightly hollowed or cupped shape which often characterizes such devices. Spoons are used either in casting or trolling, to attract and catch fish.

A great many kinds of spoons and mounting mechanisms for spoons have been made in a variety of shapes and sizes. In many cases, a spoon is mounted on a clevis, a generally U-shaped device having first and second legs with first and second aligned mounting structures, respectively, at the ends thereof for rotatable mounting on a spindle. Such spoons are often referred to as spinners, because they spin around a spindle on their clevises. In such fishing lure apparatus, the spindle is typically a wire extending along the principal axis of the lure in a manner allowing the clevis-spoon combination to revolve or spin about the spindle as the lure is pulled through the water.

The attachment of the spoon to the clevis is by passage of the clevis through a mounting hole near the front end of the spoon. The clevis extends freely through such mounting hole. In many cases, attachment of a spoon onto the clevis and/or removal from the clevis has required the use of hand tools. In such cases, the process of changing a spoon may be somewhat time-consuming and inconvenient, usually requiring two hands—sometimes when two hands may not conveniently be available.

Certain efforts in the prior art have made simpler the tasks of attaching and removing a spoon from a spindle-mounted clevis. In particular, attention is directed to British Patent Specification No. 687,699, disclosing a fishing lure apparatus with a spoon-clevis arrangement allowing easy attachment and removal of the spoon.

The device of this prior disclosure has, in addition to the more common spindle-clevis-spoon arrangement as described above, a gap which extends from the front end of the spoon to the mounting hole to facilitate attachment and removal of the spoon. The mounting hole in the spoon is large enough so that the terminal structures of the clevis can pass through it. The gap leading to the mounting hole is wider than the spindle so that it can readily pass over the spindle, but is narrower than the clevis such that the gap cannot slide across the clevis and detach while the lure apparatus is being pulled through the water.

The device of the British disclosure also has a restrictor tube around the spindle between the terminal structures. The purpose of the restrictor tube is to prevent inadvertent disconnection of the spoon from the clevis. The restrictor tube is wider than the gap in the spoon such that the tube can block disconnection of the spoon from the clevis when the tube is positioned to engage the gap. The tube is shorter than the spindle length between the terminal structures so that it can slide on the spindle to a position exposing enough of the spindle to allow passage of the gap thereover for attachment and removal of the spoon from the clevis.

Such gap-and-tube arrangement has significant problems. In such apparatus, despite the presence of the tube and its intended purpose, the spoon has a tendency to inadvertently disconnect from the clevis and can be lost. This is particularly likely to occur when the fishing lure apparatus is buffeted by varying currents and forces, as may exist both in and out of the water.

Thus, there is a need for an improved lure apparatus with an easily removable spoon with reliable resistance to inadvertent disconnection from the clevis.

OBJECTS OF THE INVENTION

It is an object of this invention to provide an improved fishing lure apparatus overcoming some of the problems and shortcomings of the prior art.

Another object of this invention is to provide an improved removable spoon and mount which facilitates connection of the spoon with a clevis or other attachment loop.

Another object of this invention is to provide a spoon which may be connected and disconnected without the use of tools, yet remains reliably in place during use.

These and other important objects will be apparent from the descriptions of this invention which follow.

SUMMARY OF THE INVENTION

The invention is an improved fishing lure apparatus which overcomes certain problems and shortcomings of the prior art. More specifically, this invention is an improved removable spoon and mount arrangement in which the spoon remains reliably on the clevis on which it is mounted, greatly reducing or eliminating inadvertent disconnection while facilitating easy connection and removal of the spoon.

The fishing lure apparatus of this invention is of the type involving a spoon mountable on a clevis which in turn is on a spindle. The clevis has, as is typical, first and second leg portions with first and second terminal structures, respectively, attached to the spindle. The spoon is of the type having a front end, a mounting hole large enough such that the first terminal structure can pass therethrough, and a gap which extends from the front end to the mounting hole, the gap being wider than the spindle but narrower than the clevis such that the gap cannot slide across the clevis. The improvement is means on the clevis blocking removal of the spoon from the spindle along the second leg portion.

In highly preferred embodiments, a restrictor tube, itself known, is slidably mounted on the spindle between the terminal structures. Such restrictor tube forms a part of the blocking structure, while characteristics of the clevis itself in combination with such tube greatly reduce or eliminate the possibility of inadvertent disconnection of the spoon.

The slidable restrictor tube is wider than the gap leading to the mounting hole in the spoon such that the tube can block disconnection of the spoon from the clevis. The restrictor tube is shorter than the spindle length between the terminal structures such that the tube can be slid on the spindle to a position exposing enough of the spindle to allow passage of the gap thereover for disconnection of the spoon from the clevis.

In highly preferred embodiments, the mounting hole includes, in addition to its main portion, a notch extending from the main portion at a position opposite the gap. Such notch is sized to receive a portion of the clevis to allow the gap to reach the spindle to facilitate disconnection of the spoon from the clevis.

In certain preferred embodiments, the blocking means includes a combination of a restrictor tube of the type described with the clevis as follows: The engagement of the tube ends with their adjacent terminal structures is such that when the tube first end engages the first terminal structure there is insufficient clearance between the tube second end and the second terminal structure to allow disconnection of the spoon, while when the tube second end engages the second terminal structure there is sufficient clearance between the tube first end and the first terminal structure to allow disconnection.

Most preferably, this is accomplished by the second leg portion being angled away from the first leg portion such that engagement of the tube second end and the second terminal structure is recessed. Recessing may be by other means instead (or as well). Recessing makes a small part of the restrictor tube length unavailable for blocking. With less of the tube available for blocking, a greater clearance will be available between the first end of the restrictor tube and the first terminal structure than between the tube second end and second terminal structure.

Regardless of how recessing is accomplished, there should be a greater recessing of the engagement of the tube second end and the second terminal structure than of the tube first end and the first terminal structure. The lesser degree of recessing in the engagement of the tube first end and first terminal structure means that less clearance is provided between the tube second end and second terminal structure than between the tube first end and first terminal structure.

Another preferred blocking means, which may be in the same or another embodiment, involves the following: The clevis is shaped such that when the tube first end engages the first terminal structure the shortest distance between the tube second end and the second leg portion of the clevis is insufficient for movement of the spoon to the second terminal structure for disconnection. This may be accomplished by the aforementioned angled second leg configuration. In such case, the clearance between the second end of the restrictor tube and the closest point of the second leg is too small to allow passage of the spoon.

In another embodiment, the second terminal structure (and not the first) is sufficiently large to block removal of the spoon thereover. This is because the mounting hole cannot pass over the second terminal structure; removal must be over the first terminal structure, which is more reliably blocked by the restrictor tube.

The gapped spoon of this invention facilitates connection and disconnection from the clevis. No tools are required either for connection or disconnection. Yet this invention reliably keeps the spoon on the clevis, preventing inadvertent disconnection even when random currents or forces are applied.

DETAILED DESCRIPTION OF PREFERRED EMBODIMENTS

Figure 1:
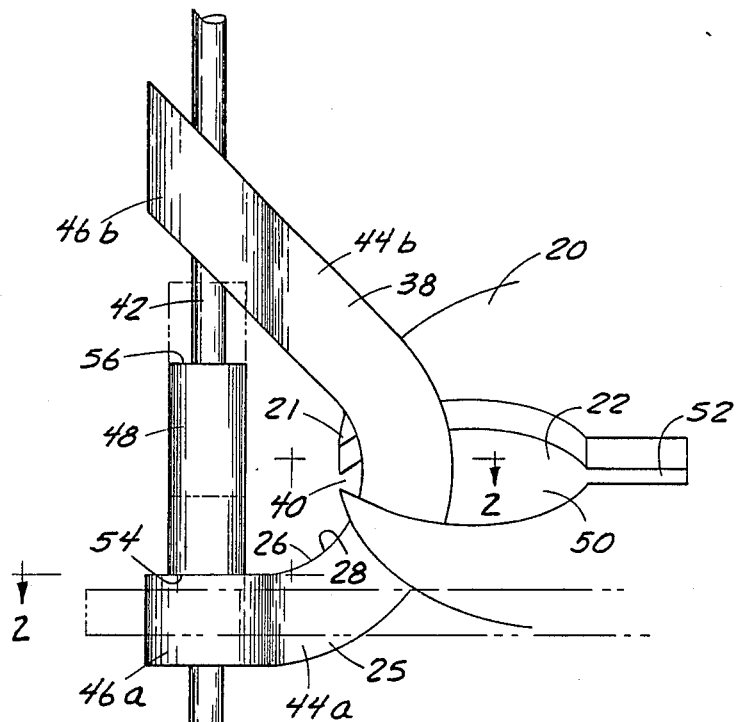
FIG. 1 is an enlarged side elevation of a preferred fishing lure apparatus in accordance with this invention.
Figure 2:
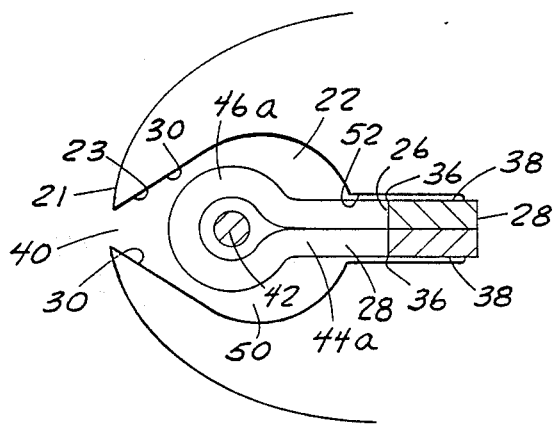
FIG. 2 is a top sectional view of the device of FIG. 1, taken along section 2—2, with the restrictor tube raised and the spoon moved to a lower, laterally offset position for disconnection from the clevis.

The drawing shows a fishing lure apparatus having a unique spindle-clevis-spoon arrangement in accordance with this invention. The spoon is identified by numeral 20, the clevis by numeral 25, and the spindle by numeral 42.

Spoon 20 has a front end 21 and a mounting hole 22 adjacent thereto. Mounting hole 22 has a leading edge portion 23 which is toward front end 21. Spoon 20 is mounted on generally rigid clevis 25. For such mounting, clevis 25 extends loosely through mounting hole 22 of spoon 20. Clevis 25 has an inner edge 26 which includes a spoon-engagement portion 28. Leading edge 23 is engaged by spoon-engagement portion 28 of inner edge 26 of clevis 25 while the fishing lure apparatus is pulled through the water as in trolling and in casting.

Clevis 25 is generally planar, having opposed first and second planar surfaces 38. Inner edge 26 of each such clevis is substantially straight in cross-section with edgepoints 36 being formed at the intersection of inner edge 26 and planar surfaces 38. The cross-sectional shape of the clevis can vary.

Spoon 20 has a gap 40 in its leading edge 23. Gap 40 extends from leading edge 23 to front end 21 of spoon 20. Gap 40 is narrower than the clevis extending through mounting hole 22. This dimensioning keeps spoon 20 from disconnecting from clevis 25 as the fishing lure apparatus is pulled through the water. Spindle 42, which preferably is formed of wire, is narrower than gap 40. This allows disconnection of spoon 20 from clevis 25 to begin by moving it off the open end of clevis 25 until gap 40 passes over spindle 42. The remainder of the motions for disconnection will be described after a more detailed description of clevis 25.

Clevis 25 has first and second leg portions 44a and 44b with first and second terminal structures 46a and 46b at their respective ends. Terminal structures 46a and 46b are each pivotably attached to spindle 42 such that the spoon-clevis combination can spin around spindle 42. Terminal structure 46a is small enough to pass through mounting hole 22 in spoon 20. This allows disconnection of spoon 20 from clevis 25 to be completed, by moving spoon 20 beyond clevis 25 near first terminal structue 46a and from there over spindle 42 again to a position remote from the remainder of the apparatus.

The connection of spoon 20 with clevis 25 is carried out by reversing the disconnection operations just described. There is no need for tools for connection or disconnection Thus, the spoons can readily be replaced with other gapped spoons.

A restrictor tube 48 is around spindle 42 between terminal structures 46a and 46b. Restrictor tube 48 is wider than gap 40 such that it blocks inadvertent disconnection of spoon 20. But tube 48 is shorter than the length of the spindle which extends between terminal structures 46a and 46b such that it can intentionally be slid on the spindle to a position exposing enough of spindle 42, near first terminal structure 46a, to allow gap 40 to reach and pass over spindle 42.

Mounting hole 22 includes a main portion 50 and a notch 52 extending from it at a position opposite gap 40. Notch 52 is sized to receive a portion of clevis 25 in order that gap 40 may reach and pass over an exposed portion of spindle 42.

Restrictor tube 48 has first and second ends 54 and 56 which are adjacent to terminal structures 46a and 46b of first and second clevis leg portions 44a and 44b, respectively. The engagement of tube first end 54 with first terminal structure 46a is such that during such engagement there is insufficient clearance between tube second end 56 and second terminal structure 46b to allow spoon front end 21 and its gap 40 to reach spindle 42 for disconnection. The shortest distance between tube second end 56 and second leg portion 44b is insufficient for passage of spoon 20. In contrast, however, the engagement of tube second end 56 with second terminal structure 46b is such that during such engagement there is sufficient clearance between tube first end 54 and first terminal structure 46a to allow spoon front end 21 and its gap 40 to reach spindle 42 for disconnection.

Such differing engagement characteristics of restrictor tube ends and terminal structures may be accomplished in various ways shown in the drawing. In one preferred form second leg portion 44b of clevis 25 is angled away from first leg portion 44a. This readily allows the engagement of tube second end 56 and second terminal structure 46b to be recessed, which in turn creates sufficient space for spoon removal just below tube first end 54.

There is a greater extent of recessing between tube second end 56 and second terminal structure 46b than there is between tube first end 54 and first terminal structure 46a. Recessing and a difference in recessing may be accomplished in various ways.

Making second terminal structure 46b large enough such that it cannot pass through mounting hole provides another means to block inadvertent removal of spoon 20 from clevis 25. With second terminal structure 46b of a size generally comparable to the size of first terminal structure 46a, and thus able to pass through mounting hole 22, the unique relationships of spoon 20 with clevis 25 and spindle 42, as described, block inadvertent removal of spoon 20.

The fishing lure apparatus described herein can be made using readily available parts and materials. Acceptable parts and materials would be apparent to those skilled in the art who become familiar with this invention. Variations are possible, particularly for lures of particularly small or large size.

While the principles of this invention have been described in connection with specific embodiments, it should be understood clearly that these descriptions are made only by way of example and are not intended to limit the scope of the invention.

I claim:

1. In fishing lure apparatus of the type including: a spindle; a clevis having first and second leg portions with first and second terminal structures, respectively, attached to the spindle; and a spoon having a front end, a mounting hole large enough such that the first terminal structure an pass therethrough, and a gap which extends from the front end to the mounting hole, said gap being wider than the spindle but narrower than the clevis such that the gap cannot slide across the clevis, the improvement comprising means on the clevis blocking removal of the spoon from the spindle along said second leg portion.

2. The fishing lure apparatus of claim 1 further comprising a restrictor tube around the spindle between the terminal structures, said restrictor tube being:
   wider than the gap such that the tube can block disconnection of the spoon from the clevis; and
   shorter than the spindle length between the terminal structures such that the tube can be slid on the spindle to a position exposing enough of the spindle to allow passage of the gap thereover for disconnection of the spoon from the clevis.

3. The fishing lure apparatus of claim 1 wherein the mounting hole includes a main portion and a notch extending therefrom opposite the gap, said notch sized to receive a portion of the clevis to allow the gap to reach the spindle to facilitate disconnection of the spoon from the clevis.

4. The fishing lure apparatus of claim 1 wherein the blocking means comprises, in combination:
   a restrictor tube around the spindle between the terminal structures, said restrictor tube having first and second ends adjacent to the first and second terminal structures, respectively, and said tube being wider than the gap such that the tube can block disconnection of the spoon from the clevis and shorter than the spindle length between the terminal structures such that it can be slid on the spindle to a position exposing enough of the spindle adjacent to the first terminal structure to allow passage of the gap thereover for disconnection of the spoon from the clevis;
   the engagement of the tube ends with their adjacent terminal structures being such that when the tube first end engages the first terminal structure there is insufficient clearance between the tube second end and the second terminal structure to allow disconnection of the spoon, and when the tube second end engages the second terminal structure there is sufficient clearance between the tube first end and the first terminal structure to allow disconnection.

5. The fishing lure apparatus of claim 4 wherein the mounting hole includes a main portion and a notch extending therefrom opposite the gap, said notch sized to receive a portion of the clevis to allow the gap to reach the spindle to facilitate disconnection of the spoon from the clevis.

6. The fishing lure apparatus of claim 4 wherein the second leg portion is angled away from the first leg portion such that engagement of the tube second end and the terminal structure of the second leg portion is recessed.

7. The fishing lure apparatus of claim 6 wherein the mounting hole includes a main portion and a notch extending therefrom opposite the gap, said notch sized to receive a portion of the clevis to allow the gap to reach the spindle to facilitate disconnection of the spoon from the clevis.

8. The fishing lure apparatus of claim 1 wherein the blocking means comprises, in combination:
   a restrictor tube around the spindle between the terminal structures, said restrictor tube having first and second ends adjacent to the first and second terminal structures, respectively, and said tube being wider than the gap such that the tube can block disconnection of the spoon from the clevis and shorter than the spindle length between the terminal structures such that it can be slid on the spindle to a position exposing enough of the spindle adjacent to the first terminal structure to allow passage of the gap thereover for disconnection of the spoon from the clevis;

the configuration of the clevis being such that when the tube first end engages the first terminal structure the shortest distance between the tube second end and the second leg portion of the clevis is insufficient for movement of the spoon to the second terminal structure for disconnection.

9. The fishing lure apparatus of claim 8 wherein the mounting hole includes a main portion and a notch extending therefrom opposite the gap, said notch sized to receive a portion of the clevis to allow the gap to reach the spindle to facilitate disconnection of the spoon from the clevis.

10. The fishing lure apparatus of claim 8 wherein the second leg portion is angled away from the first leg portion such that engagement of the tube second end and the terminal structure of the second leg portion is recessed.

11. The fishing lure apparatus of claim 10 wherein the mounting hole includes a main portion and a notch extending therefrom opposite the gap, said notch sized to receive a portion of the clevis to allow the gap to reach the spindle to facilitate disconnection of the spoon from the clevis.

12. The fishing lure apparatus of claim 1 wherein the blocking means comprises the second terminal structure being sufficiently large such that it cannot pass through the mounting hole.

13. The fishing lure apparatus of claim 1 wherein the blocking means comprises a greater recessed engagement of the tube second end and the second terminal structure than of the tube first end and the first terminal structure, whereby the resulting lesser degree of recessing in the engagement between the tube first end and first terminal structure provides less clearance between the tube second end and second terminal structure than between the tube first end and first terminal structure.

* * * * *

UNITED STATES PATENT AND TRADEMARK OFFICE
CERTIFICATE OF CORRECTION

PATENT NO. : 4,864,765
DATED : September 12, 1989
INVENTOR(S) : Allen P. Vanderplow It is certified that error appears in the above-identified patent and that said Letters Patent is hereby corrected as shown below:

In claim 1, line 6, change "an" to --can--.

Signed and Sealed this

Seventh Day of August, 1990

Attest:

HARRY F. MANBECK, JR.

*Attesting Officer*      *Commissioner of Patents and Trademarks*